Patented Jan. 12, 1932

1,841,322

UNITED STATES PATENT OFFICE

CLARENCE M. CARSON, OF AKRON, OHIO, ASSIGNOR TO THE GOODYEAR TIRE & RUBBER COMPANY, OF AKRON, OHIO, A CORPORATION OF OHIO

METHOD OF SECURING RUBBER TO METAL AND PRODUCT THEREOF

No Drawing. Application filed February 23, 1929. Serial No. 342,310.

This invention relates to the securing of rubber to metal, and it has particular relation to a method of securing rubber to metal by means of a cement consisting essentially of latex and hæmoglobin.

The object of the invention is to provide a strong, permanent union between rubber and metallic surfaces, which is not affected by heat or by the action of moisture or other solvents.

Heretofore, it has been proposed to cement rubber to metal by means of a material consisting essentially of latex and hæmoglobin (a material obtained from clotted blood), together with certain vulcanization ingredients, such as sulphur, zinc oxide and organic accelerators. By employment of this method, fairly strong and permanent unions were obtained between the two materials. However, unions so prepared, upon being exposed to water or water vapor, were quickly impaired and permitted separation of the rubber from the metal.

This invention consists in the discovery that by incorporating into the latex-hæmoglobin mixture a tanning agent for the hæmoglobin, e. g. formaldehyde, a cement is obtained which, when used for bonding rubber to metal, produces unions which are not appreciably affected by moisture. Also, such unions are more strong and durable under normal conditions than those heretofore obtained from latex and hæmoglobin containing no tanning agent.

In practicing the invention, a cement consisting essentially of hæmoglobin, latex and a tanning agent, such as formaldehyde, together with sulphur and a vulcanization accelerator, is spread in a relatively thick coating upon a freshly cleaned metallic surface. It is permitted to dry for approximately one-half hour at 65° C. and then for one and one-half or two hours at 120° C. in order thoroughly to dry and to bake the material. The freshly dried surface is permitted to cool, is roughened with a wire brush, and a thoroughly cleaned rubber stock, such as that employed in the manufacture of solid tires, wringer rolls, etc., is applied to the surface and is cured according to known methods.

Although the proportions of the various ingredients employed in the cement may be varied within relatively wide limits, the following is a specific example of a compound whose use insures highly satisfactory results:

| | |
|---|---|
| Hæmoglobin | 100 grams. |
| Water | 300 cc. |
| Sulphur | 45 grams. |
| Zinc oxide | 5 grams. |
| Diphenylguanidine | 1 gram. |
| Latex (30% concentration) | 575 cc. |
| Formaldehyde (40% concentration) | 10 cc. |

The sulphur employed in the cement so prepared obviously functions as a vulcanization agent. The diphenylguanidine is employed as an accelerator of vulcanization. It will readily be understood that any other convenient accelerator, such as mercaptobenzothiazole or thiocarbanilide, may be substituted therefor. The formaldehyde constitutes a tanning agent which tends to harden the hæmoglobin and render it impervious to moisture. Other tanning agents, for example potassium dichromate or potassium ferrocyanide or aluminum sulfate, may be substituted therefor.

Unions obtained by employment of the cement described are so strong and durable that, when subjected to the test of cutting the rubber until the metal is exposed and then tearing the rubber away from the metal by means of pliers or other convenient tools, the rubber will tear outside of the union, leaving the latter intact.

The new cements are substantially non-thermoplastic and do not soften at temperatures to which rubber goods are ordinarily exposed. Unions prepared by this method may be subjected to the action of moisture without appreciable impairment of the strength thereof. This is in direct contrast to the unions obtained from latex-hæmoglobin cements containing no tanning agent. The latter upon being subjected to the action of water are so weakened that the rubber may be readily stripped from the metal without the exertion of any great amount of force.

Although I have described only the preferred embodiments of the invention, it will be apparent to those skilled in the art that it is not so limited, but that various modifications may be made therein without departing from the spirit of the invention or from the scope of the appended claims.

What I claim is:

1. A method of securing rubber to metal which comprises coating a surface of one of the materials to be secured with a cement comprising latex, hæmoglobin, sulphur and a tanning agent, bringing the coated surface into contact with a surface of the other material, and vulcanizing the rubber.

2. A method of securing rubber to metal which comprises coating a surface of one of the materials to be secured with a cement comprising latex, hæmoglobin, sulphur and formaldehyde, bringing the coated surface into contact with a surface of the other material and vulcanizing the rubber.

3. A method of securing rubber to metal which comprises cementing the rubber and the metal together by means of a material comprising latex, hæmoglobin, sulphur and formaldehyde, and subjecting the whole to vulcanization.

4. A method of securing rubber to metal which comprises cementing the rubber and the metal together by means of a non-thermoplastic cement comprising latex, hæmoglobin, sulphur, an accelerator of vulcanization and a tanning agent.

5. A method of securing rubber to metal which comprises cementing the rubber and the metal together by means of a cement comprising latex, hæmoglobin, sulphur, an accelerator of vulcanization and formaldehyde.

6. A method of securing rubber to metal which comprises cementing the rubber and the metal together by means of a cement comprising latex, hæmoglobin, sulphur, an accelerator of vulcanization and formaldehyde, and subjecting the whole to vulcanization.

7. A method of securing rubber to metal which comprises coating a surface of one of the materials to be secured by means of a cement comprising latex, hæmoglobin, sulphur, an accelerator of vulcanization and a tanning agent, thoroughly drying and baking the cement, bringing the coated surface into contact with a surface of the other material, and subjecting the whole to vulcanization.

8. A method of securing rubber to metal which comprises coating a surface of one of the bodies to be secured by means of a cement comprising latex, hæmoglobin, sulphur, an accelerator of vulcanization and formaldehyde, drying the cement at a temperature of approximately 120° C. for a period of at least one and one-half hours, bringing the surfaces that are to be secured into contact with each other, and subjecting the whole to vulcanization.

9. A composite body comprising a layer of rubber and a layer of metal, the two being cemented together by means of a layer of a material comprising hæmoglobin, latex and formaldehyde.

10. A composite body comprising a layer of rubber and a layer of metal, the two being cemented together by means of a layer of non-thermoplastic material comprising hæmoglobin, latex, sulphur and formaldehyde.

11. A composite body comprising a layer of rubber and a layer of metal, the two being cemented together by means of a layer of a material comprising hæmoglobin, latex, sulphur, an accelerator of vulcanization and formaldehyde.

12. A composite body comprising a metal portion and a rubber portion, the two portions being cemented together by means of an intermediate layer of a cement comprising hæmoglobin, latex, sulphur, an accelerator of vulcanization, zinc oxide and formaldehyde.

In witness whereof, I have hereunto signed my name.

Signed at Akron, in the county of Summit and State of Ohio, U. S. A., this 22nd day of February, 1929.

CLARENCE M. CARSON.